(12) United States Patent
Lindhorst

(10) Patent No.: US 10,596,972 B2
(45) Date of Patent: Mar. 24, 2020

(54) BACK REST OF A VEHICLE SEAT HAVING A POCKET

(71) Applicant: Volkswagen Aktiengesellschaft, Wolfsburg (DE)

(72) Inventor: Volker Lindhorst, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/215,192

(22) Filed: Dec. 10, 2018

(65) Prior Publication Data

US 2019/0106060 A1    Apr. 11, 2019

Related U.S. Application Data

(63) Continuation of application No. PCT/EP2017/064053, filed on Jun. 9, 2017.

(30) Foreign Application Priority Data

Jun. 9, 2016 (DE) .................... 10 2016 210 197

(51) Int. Cl.
*B60R 7/00* (2006.01)
*B60R 7/04* (2006.01)
*B60R 11/00* (2006.01)

(52) U.S. Cl.
CPC ............. *B60R 7/005* (2013.01); *B60R 7/043* (2013.01); *B60R 2011/0015* (2013.01)

(58) Field of Classification Search
CPC .. B60R 7/005; B60R 7/043; B60R 2011/0015

USPC ................................................ 297/188.01
See application file for complete search history.

(56) References Cited

U.S. PATENT DOCUMENTS

| 9,597,990 B2 | 3/2017 | Line et al. |
| 2008/0238169 A1 | 10/2008 | Hicks et al. |
| 2009/0089841 A1 | 4/2009 | Hanlon et al. |
| 2010/0244505 A1 | 9/2010 | Demick et al. |
| 2015/0175265 A1* | 6/2015 | Thiele .............. B64D 11/00152 297/188.04 |

FOREIGN PATENT DOCUMENTS

| DE | 2364512 A1 | 6/1975 |
| DE | 29603661 U1 | 5/1996 |
| DE | 10036065 A1 | 1/2002 |
| DE | 102005041935 A1 | 3/2007 |
| DE | 102008010032 A1 | 10/2008 |
| DE | 102008050168 A1 | 5/2009 |

(Continued)

OTHER PUBLICATIONS

International Search Report dated Oct. 6, 2017 in corresponding application PCT/EP2017/064053.

*Primary Examiner* — Mark R Wendell
(74) *Attorney, Agent, or Firm* — Muncy, Geissler, Olds & Lowe, P.C.

(57) ABSTRACT

A backrest of a vehicle seat, which includes a pocket. It is provided that the rotation axis, which is formed in the area of the lower edge of the cover and around which the cover is pivoted when an object is stored in the pocket, is variable with respect to its distance from the vehicle seat or the backrest. This takes place, for example, in that the cover is connected to a double joint in the area of its lower edge, and the double joint, in turn, is connected to the vehicle seat.

3 Claims, 3 Drawing Sheets

(56) References Cited

FOREIGN PATENT DOCUMENTS

| | | |
|---|---|---|
| DE | 102007058269 A1 | 6/2009 |
| DE | 102010012072 A1 | 11/2010 |
| DE | 102009039471 A1 | 3/2011 |
| DE | 102012025507 A1 | 12/2013 |
| DE | 202014102861 U1 | 7/2014 |
| DE | 102015208376 A1 | 11/2015 |
| FR | 2931806 A1 | 12/2009 |
| JP | S58118050 U | 8/1983 |
| JP | S58184355 U | 12/1983 |
| JP | S63175454 U | 11/1988 |
| JP | 2013082452 A | 5/2013 |

\* cited by examiner

BACK REST OF A VEHICLE SEAT HAVING A POCKET

This nonprovisional application is a continuation of International Application No. PCT/EP2017/064053, which was filed on Jun. 9, 2017, and which claims priority to German Patent Application No. 10 2016 210 197.8, which was filed in Germany on Jun. 9, 2016, and which are both herein incorporated by reference.

BACKGROUND OF THE INVENTION

Field of the Invention

The present invention relates to a backrest of a vehicle seat, which includes a pocket.

Description of the Background Art

For example, a backrest of a vehicle seat is known according to DE 100 36 065 A1, which is incorporated herein by reference. A pocket is disposed on the back wall of the backrest. The pocket is formed by the backrest and a cover. The lower edge of the cover is connected to the backrest. The cover is connected to the back rest on both sides by a side part. The side parts are made from a flexible material. As a result, the pocket opens in the area of the upper edge of the cover, the cover being rotated around a rotation axis in the area of the lower edge of the cover when the pocket is opened or closed. If the object to be stored in the pocket is comparatively thick, the cover is opened wide in the area of the upper edge. A certain compensation by the pocket of the resulting uneven encompassing of the object to the stored takes place by means of the side parts made from the flexible material. However, the cover is then unstable with respect to the vehicle seat. This is the case, in particular, if the cover is not made from a flexible material but rather is a so-called solid cover, which has a dimensionally stable design. A solid cover of this type is viewed as being particularly attractive and high in quality.

The instability of an, in particular, solid cover of a pocket of this type may not be satisfactorily prevented even by elastic elements in the area of the flexible side parts, as proposed, for example, according to DE 10 2005 041 935 A1.

SUMMARY OF THE INVENTION

It is therefore an object of the present invention to provide a cover of a pocket disposed on a backrest of a vehicle seat in a stable manner in such a way that the cover is always stably positioned with respect to the vehicle seat regardless of the thickness of the object to be stored in the pocket.

According to an exemplary embodiment of the invention, this object is achieved in that the rotation axis of the cover, which is situated in the area of the lower edge of the cover, is deflected when an object is stored in the pocket. As described above in connection with the acknowledgment of the prior art, the pocket opens in the area of the upper edge of the cover, the cover being rotated around a rotation axis in the area of the lower edge of the cover when the pocket is opened or closed. According to the invention, this rotation axis, which is formed in the area of the lower edge of the cover and around which the cover is pivoted when an object is stored in the pocket, is variable with regard to its distance from the vehicle seat or the backrest. According to the invention, the rotation axis is displaceably guided. The rotation axis then has a different, in particular greater, distance from the vehicle seat when the rotation axis is displaced, as a result of the introduction of an object into the pocket for storing, in particular, a comparatively thick object, than it had prior to the introduction of this object or prior to the displacement of the rotation axis. In particular, the rotation axis is also parallel to the vehicle seat when the rotation axis is displaced, however at a changed, in particular greater, distance from the vehicle seat. Due to the fact that the rotation axis is settable relative to the vehicle seat with respect to the distance, according to the invention, on the one hand, a compensation of the distance between the cover and the backrest takes place, and the object to be stored is uniformly encompassed. On the other hand, the cover is stabilized by the means provided to deflect/displace the rotation axis of the cover.

The rotation axis of the cover situated in the area of the lower edge of the cover can be deflected or varied with regard to its distance from the vehicle seat or the backrest in that the cover is connected to a multiple joint/double joint in the area of its lower edge, and the multiple joint/double joint, in turn, is connected to the vehicle seat, in particular the backrest. The cover is preferably rotatably movably connected to a first joint of a swinging arm in the area of its lower edge, and the vehicle seat is rotatably movably connected to a second joint of the swinging arm. Due to the use of a multiple joint/double joint of this type including a swinging arm, the cover is guided in a particularly stable manner. Due to the dimensioning of the swinging arm the necessary maximum thickness compensation may be easily set. According to the invention, the thickness compensation advantageously takes place automatically due to the use of a multiple or double hinge. Due to the use of a multiple or double joint, the cover is particularly effectively stabilized when an object is stored in the pocket and the rotation axis of the cover is guided during the displacement thereof.

The rotation axis of the cover situated in the area of the lower edge of the cover can be deflected or varied with respect to its distance from the vehicle seat/backrest in that the cover is rotatably movably disposed on a spring element in the area of its lower edge, the spring element being situated on the vehicle seat or the backrest in such a way that the distance between the vehicle seat and the cover may be varied against the spring action of the spring element. In particular, the spring element is a spring band disposed horizontally in the lower area of the vehicle seat or the backrest, to which, in turn, a holder is fastened for a rotatable arrangement of the cover on the spring band. The use of a spring element is very easy, space-saving and cost-saving. A stabilization of the cover in the event that an object is stored in the pocket is also ensured by the spring element and the forces applied thereby. Due to the forces acting upon the cover by the spring element, a stable guidance of the displacement of the rotation axis of the cover furthermore takes place.

The rotation axis of the cover situated in the area of the lower edge of the cover can be deflected or varied with respect to its distance from the vehicle seat/backrest in that the cover interacts with a plurality of spring elements. These spring elements are disposed between the cover and the vehicle seat/backrest/rear backrest panel of the vehicle seat. These spring elements are connected to the cover, to the vehicle seat and to each other on the side of the cover facing the vehicle seat. The spring elements connected to each other in this manner interact with the vehicle seat and the cover in such a way that, when an object to be stored in the pocket is introduced into the pocket, the cover is first lifted away from the vehicle seat against the spring action of a first spring element. The cover is pivoted around the rotation axis situated in the area of the lower edge of the cover. The cover is initially supported on the vehicle seat in the area of the lower edge of the cover. During the further course of the opening operation, the cover is additionally lifted away from the vehicle seat against the spring action of another spring element, so that the rotation axis of the cover is displaced or the distance of the rotation axis of the cover from the vehicle seat is changed/increased. The spring elements used apply a very even and well distributed holding force to the object to be stored in the pocket. Bending springs, which are lightweight and require little space, are preferably used. The spring elements are very easy to mount and position. Due to the forces acting upon the cover by the spring elements, a stable guidance of the displacement of the rotation axis of the cover furthermore takes place.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
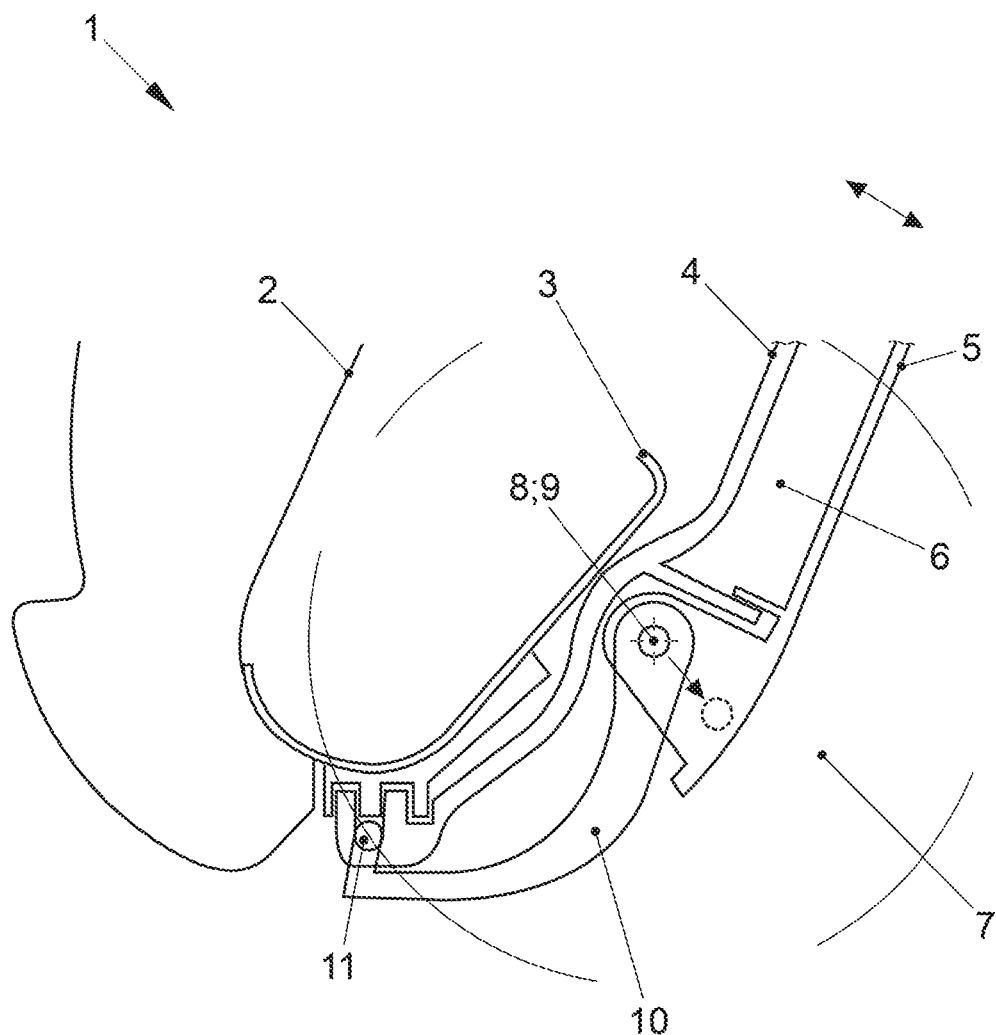
FIG. 1 shows an embodiment of a pocket, including a double joint.

FIG. 1 shows a vehicle seat 1 in a view from the side, including a backrest 2, a backrest frame 3 and a backrest panel 4. Backrest panel 4 is disposed on the rear side of vehicle side 1. Vehicle seat 1 includes, as is generally known, a seat and backrest surface or a cushioning, which, however, is not illustrated. A vehicle seat 1 of this type may be used in any possible vehicle, whether it be an automobile, an aircraft or a boat. A pocket 6 is formed by the interaction between backrest panel 4 and a cover 5. Cover 5 is preferably dimensionally stable, i.e. it is a so-called solid cover 5. Pocket 6 is virtually a certain hollow space between backrest panel 4 and cover 5. Rotation axis 8 of cover 5 is situated in the area of lower edge 7 of cover 5. Cover 5 is rotated around rotation axis 8 when pocket 6 is opened or closed. An opening or closing of pocket 6 is indicated by a double arrow. Cover 5 is connected to a multiple joint/double joint in the area of its lower edge 7. The multiple joint/double joint, in turn, is connected to vehicle seat 1, in particular backrest 2. Cover 5 is rotatably movably connected to a first joint 9 of a swinging arm 10 in the area of its lower edge 7, and vehicle seat 1 is rotatably movably connected to a second joint 11 of swinging arm 10. First joint 9 corresponds to rotation axis 8, i.e. the rotation axis of first joint 9 corresponds to rotation axis 8 of cover 5. According to FIG. 1, vehicle seat 1 is thereby connected to second joint 11 of swinging arm 10, so that second joint 11 is fastened to backrest panel 4, which, in turn, is connected to vehicle seat 1. Alternatively, second joint 11 may also be connected to backrest frame 3 or backrest 2. If pocket 6 is opened by lifting cover 5 away from vehicle seat 1 or from backrest panel 4, cover 5 is initially rotated around rotation axis 8. If the opening operation continues, for example because a comparatively thick object is to be introduced into pocket 6 for storage, a deflection of swinging arm 10 takes place and thus a deflection of rotation axis 8 of cover 5/first joint 9 or a change/increase in the distance of rotation axis 8 of cover 5 from vehicle seat 1, since swinging arm 10 is rotated around second joint 11. The displacement of rotation axis 8 is indicated by means of the single arrow in FIG. 1 (dashed circle). The use of the deflection of swinging arm 10 during an opening operation of pocket 6 may be controlled, for example by means of a projection, which is disposed on the side of the cover facing vehicle seat 1 and engages with another projection, which is disposed on the side of vehicle seat 1/backrest panel 4 facing cover 5. Due to the dimensioning of swinging arm 10, i.e. the length of swinging arm 10, the desired maximum possible distance of cover 5 from vehicle seat 1/backrest panel 4 may be easily set during construction. This make also take place with the aid of side parts, which are not illustrated in FIG. 1 and which run on both side edges of cover 5 from its upper edge to its lower edge, as is known according to the prior art.

Figure 2:
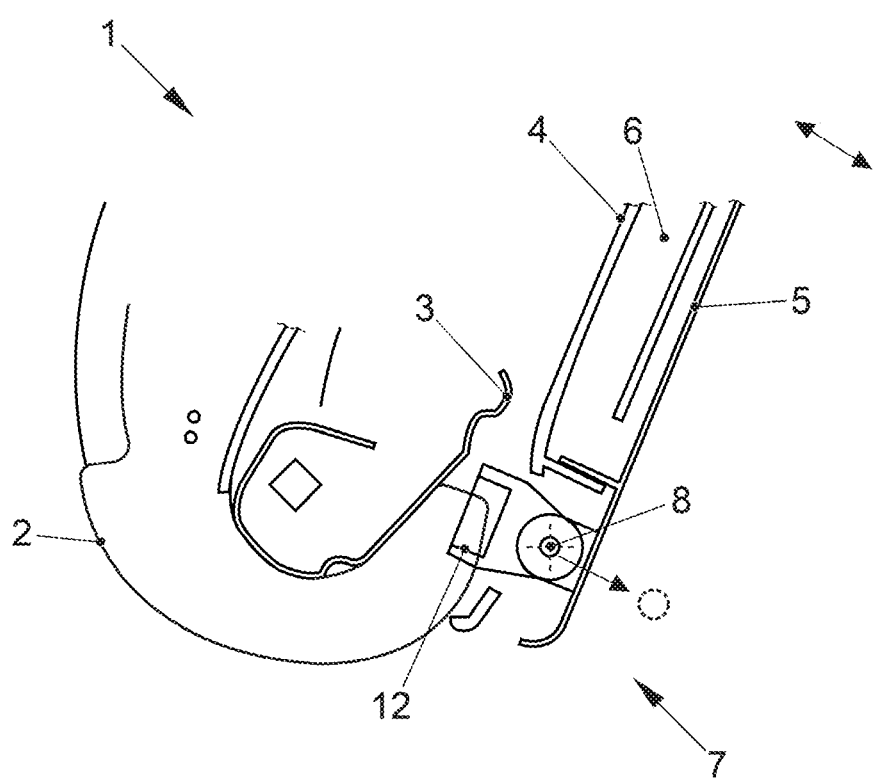
FIG. 2 shows an embodiment of a pocket, including a spring element.

As is shown in FIG. 2, in another preferred embodiment of the invention, it is provided that rotation axis 8 of cover 5 situated in the area of lower edge 7 of cover 5 is deflected or varied with respect to its distance from vehicle seat 1/backrest 2 in that cover 5 is rotatably movably disposed on a spring element 12 in the area of its lower edge 7. Spring element 12 is preferably a spring band or an elongated bending spring. Spring element 12 preferably includes multiple extensions projecting in the direction of cover 5, which, in turn, interact with extensions preferably projecting in the direction of vehicle seat 1, which are situated on cover 5, so that a pivot joint is formed, through which rotation axis 8 of cover 5 runs. Spring element 12 is disposed on vehicle seat 1 or backrest 2 in such a way that the distance between vehicle seat 1 and cover 5 may be changed against the spring action of spring element 12. As is indicated by the double arrow, when cover 5 is opened, cover 5 is pivoted around rotation axis 8 until cover 5 is brought into contact with vehicle seat 1 in the area of its lower edge 7, and a further opening of cover 5 is possible only against the spring action of spring element 12, cover 5 being supported on vehicle seat 1 in the area of its lower edge 7, and spring element 12 being deflected in the direction of cover 5, so that rotation axis 8 is displaced, or the distance of rotation axis 8 from vehicle seat 1 is changed/increased. This is shown in FIG. 2 by means of the single arrow (dashed circle). Spring element 12 is preferably disposed horizontally in the lower area of vehicle seat 1 or backrest 2.

Figure 3:
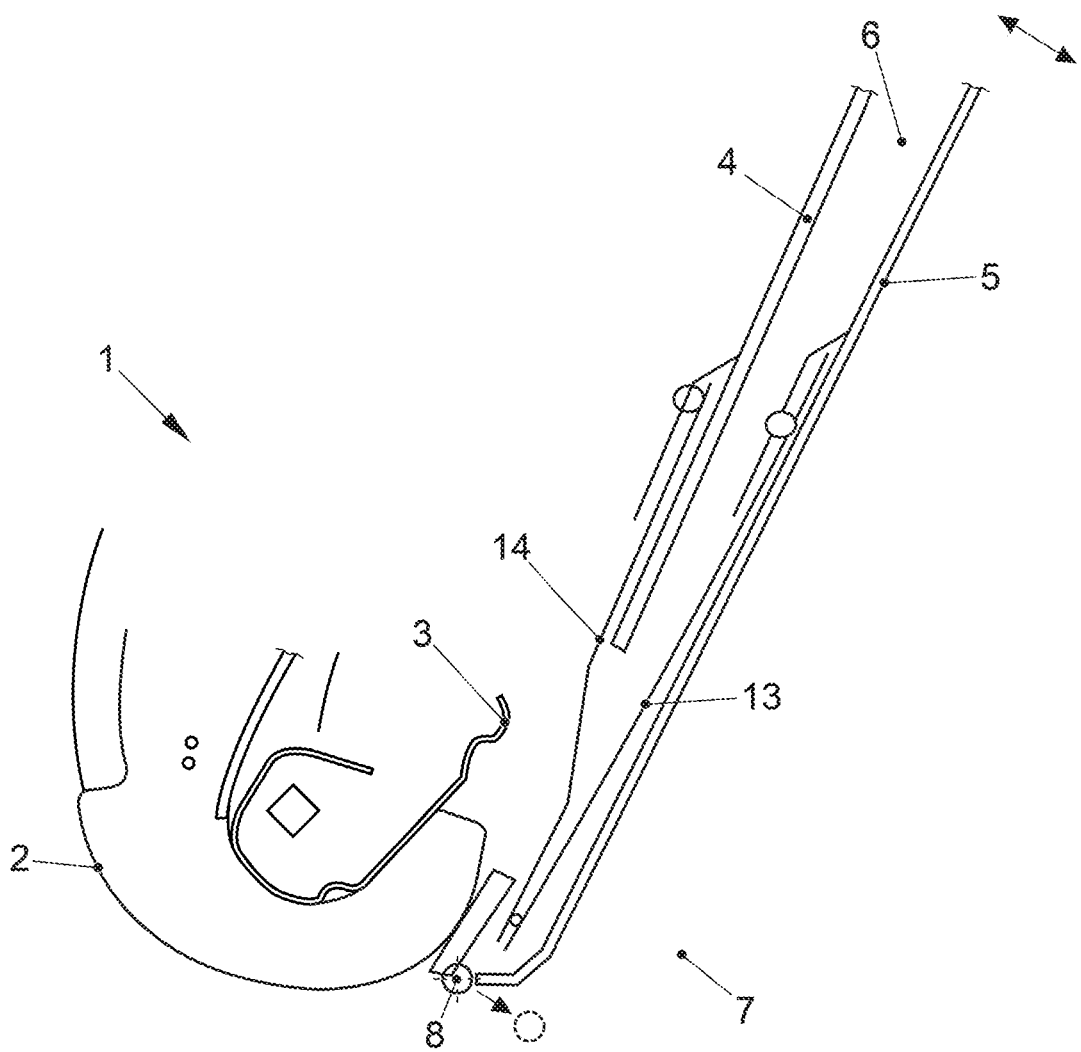
FIG. 3 shows an embodiment, including multiple spring elements.

FIG. 3 shows another preferred embodiment of the invention. It is provided that rotation axis 8 of cover 5 situated in the area of lower edge 7 of cover 5 is deflected or varied with respect to its distance from vehicle seat 1/backrest 2 in that cover 5 interacts with a plurality of spring elements 13, 14. These spring elements 13, 14 are disposed between cover 5 and vehicle seat 1/backrest 2/rear backrest panel 4 of vehicle seat 1. At least one first spring element 13 facing/assigned to cover 5 extends along cover 5 in the area between lower edge 7 of cover 5 and the upper edge of cover 5 and is preferably rotatably movably/pivotably movably fastened to cover 5. At least one additional spring element 14 facing/assigned to vehicle seat 1/backrest 2/backrest panel 4 extends along vehicle seat 1 in the area between the lower edge and the upper edge of vehicle seat 1/backrest 2/backrest panel 4, this spring element 14 penetrating backrest panel 4 through an opening in backrest panel 4 and preferably being rotatably movably/pivotably movably fastened in the interior of backrest 2/on the side of backrest panel 4 facing vehicle seat 1. Additional spring element 14 is preferably provided with an offset design, so that it may penetrate backrest panel 4. First spring element 13 is preferably non-rotatably/pivotably connected to additional spring element 14 in the area of lower edge 7 of cover 5 between backrest panel 4 and cover 5. Spring elements 13, 14 connected to each other in this way interact with the vehicle seat and cover 5 in such a way that, when an object to be stored in pocket 6 is introduced into pocket 6, cover 5 is first lifted away from vehicle seat 1/backrest 2/backrest panel 4 against the spring action of first spring element 13, as is indicated by the double arrow in FIG. 3, cover 5 being pivoted around rotation axis 8 situated in the area of lower edge 7 of cover 5, and cover 5 being supported on vehicle seat 1/backrest 2/backrest panel 4 in the area of lower edge 7 of cover 5, cover 5 being additionally lifted away from vehicle seat 1/backrest 2/backrest panel 4 against the spring action of additional spring element 14 during the further course of the opening operation, so that rotation axis 8 of cover 5 is displaced, or the distance of rotation axis 8 of cover 5 from vehicle seat 1 is changed/increased. This is shown in FIG. 3 by means of the single arrow (dashed circle). Spring elements 13, 14 are preferably bending springs extended in a straight line or leaf springs, flat springs or elastic tongues.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A backrest of a motor vehicle seat, the backrest comprising
 a pocket formed by the backrest and a cover; and
 a rotation axis of the cover arranged in an area of a lower edge of the cover, the cover being pivoted around the rotation axis when the pocket is opened or closed,
 wherein the rotation axis is displaceable with respect to a distance of the rotation axis from the backrest so that a compensation of a distance between the cover and the backrest takes place when an object is stored in the pocket,
 wherein the cover interacts with a plurality of spring elements, including at least one first spring element and at least one additional spring element, that are disposed between the cover and the vehicle seat,
 wherein the at least one first spring element is assigned to the cover and extends along the cover in an area between the lower edge of the cover and an upper edge of the cover and is fastened to the cover,
 wherein the at least one additional spring element is assigned to the vehicle seat and extends along the vehicle seat in an area between the lower edge of the cover and an upper edge of the vehicle seat,
 wherein the at least one additional spring element penetrates a backrest panel of the vehicle seat, such that the at least one additional spring element extends through an opening in the backrest panel and is fastened in an interior of the backrest,
 wherein the at least one first spring element is connected to the at least one additional spring element in the area of the lower edge of the cover between the backrest panel and the cover so that during an opening operation when an object to be stored in the pocket is introduced into the pocket, the cover is first lifted away from the vehicle seat against a spring action of the at least one first spring element and the cover is pivoted around the rotation axis situated in the area of the lower edge of the cover, so that the cover is supported on the vehicle seat in the area of the lower edge of the cover, and wherein the cover is additionally lifted away from the vehicle seat against a spring action of the at least one additional spring element during a further course of the opening operation, so that the rotation axis of the cover is displaced and the distance of the rotation axis of the cover from the backrest is changed.

2. The backrest according to claim 1, wherein the at least one additional spring element is provided with an offset design, so that it penetrates the backrest panel.

3. The backrest according to claim 1, wherein the at least one first spring element and the at least one additional spring element are each a bending spring extended in a straight line.

* * * * *